Sept. 21, 1948.  E. H. AYERS  2,449,800
REFRIGERATION CONTROL APPARATUS
Filed Dec. 8, 1944
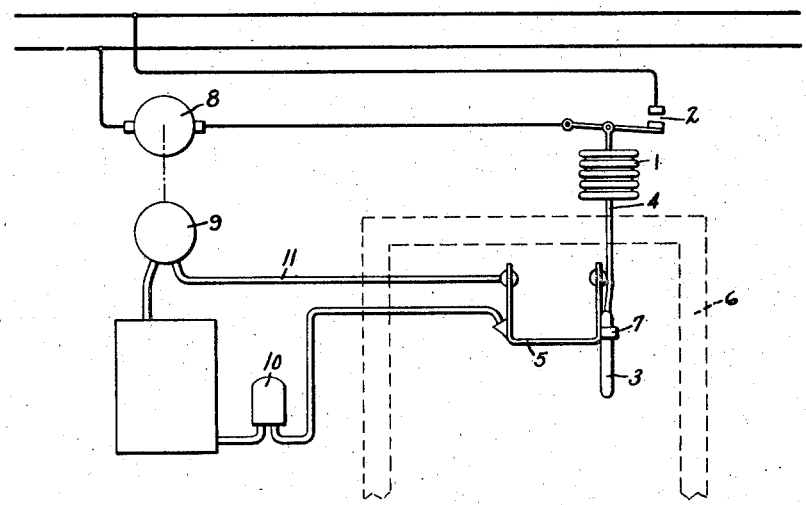
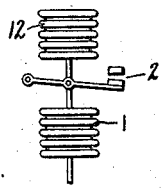
Inventor:
Edgar H. Ayers,
by Harry E. Dunlap
His Attorney.

Patented Sept. 21, 1948

2,449,800

UNITED STATES PATENT OFFICE 2,449,800

REFRIGERATION CONTROL APPARATUS

Edgar H. Ayers, Schenectady, N. Y., assignor to General Electric Company, a corporation of New York Application December 8, 1944, Serial No. 567,268

3 Claims. (Cl. 62—4)

1

My invention relates to refrigeration control apparatus, more particularly to temperature responsive control means for electrically driven refrigerators, and has for its object simple and reliable means for controlling the operation of the apparatus in response jointly to the temperature of the evaporator and the temperature of the air in the refrigerating chamber or compartment.

Electrically driven refrigerators conventionally are controlled by temperature responsive means which is almost entirely responsive to the temperature of the evaporator instead of the temperature of the air in the cooling compartment. For example, the control may operate to maintain a mean evaporator temperature of 15° F. which, under normal conditions, gives a desired refrigerating temperature of the air in the cooling compartment. With extreme changes in the ambient temperature, i. e. temperature of the outside air, the control must be adjusted to vary the evaporator temperature in order to maintain the desired compartment air temperature.

Such extreme outside air or ambient temperature changes occur when the refrigerator is located on an airplane and is moved in a relatively short time to a high altitude where the ambient temperature itself is lower than the desired refrigerating temperature. Under such conditions, the refrigerator cooling apparatus not only must be shut down, but heating means must be used in the refrigerating compartment to prevent temperatures below freezing. However, with the conventional automatic control referred to above, the cooling apparatus will continue to operate at intervals to maintain the evaporator at the mean temperature of 15° F. and will discontinue operation entirely only when the compartment air temperature falls to such a low value that the evaporator temperature fails to rise the necessary amount above 15° F. to effect the operation of the cooling apparatus.

In accordance with my invention, I provide simple and reliable means which is responsive to both the temperature of the air in the cooling compartment and the evaporator temperature so as to shut down the cooling apparatus when the compartment air temperature itself decreases to a predetermined minimum temperature, such as 35° F. In one form of my invention, I provide a temperature responsive control device having a closed end tube extending downward beyond the lower end of the evaporator into the cooling compartment with an upper portion in engagement with the evaporator. This tube is filled with a

2 vapor or gas which is liquefied by the evaporator temperature and runs down to the lower end of the tube where it is gasified again by heat received from the compartment air. The control device is thus made very responsive to the compartment air temperature.

For a more complete understanding of my invention, reference should be had to the accompanying drawing, Fig. 1 of which is a diagrammatic representation of refrigeration control means embodying my invention, while Fig. 2 is a fragmentary view showing a modified form of my invention.

Referring to the drawing, in one form of my invention I provide a temperature responsive control device of the gas filled expansible container type consisting of a bellows 1, connected to open and close a switch 2, and a temperature responsive bulb 3 connected through a tube 4 to the bellows. The bulb 3 is secured in an upright position to the evaporator 5 in a refrigerator compartment whose heat insulated walls 6 are indicated by dotted lines, these walls, it being understood, substantially air-tightly enclosing a cooling compartment. The bulb 3 is secured to the evaporator 5, as by means of a clamping band 7, with the upper end only of the bulb secured directly to the evaporator in intimate thermal relation therewith. The bulb extends downward, as shown, below the evaporator for a greater part of its length. Preferably about two-thirds of its length extends downward below the evaporator so as to be surrounded by the air in the refrigerator compartment, and therefore be directly exposed and responsive to the temperature of the air.

A fluid which is successively liquefied and gasified at the evaporator and compartment air temperatures involved is provided in the sealed chamber formed by the bellows 1, the tube 4 and bulb 3, such as methyl chloride. At the normal operating temperatures of the evaporator 5, such as a mean operating temperature of 15° F., the fluid in the bulb is condensed continually into a liquid on the inner wall of the upper portion of the bulb in engagement with the evaporator. The liquid runs down the inner wall of the bulb to the higher temperature portion where the liquid is again gasified. This action provides a very efficient and rapid transfer of heat from the compartment air to the gas in the bulb with consequent response of the gas pressure to the air temperature. When the pressure of the gas increases to a predetermined value, the switch 2 is closed whereby the refrigeration apparatus is started for operation until the gas pressure is reduced sufficiently to open the switch 2 and shut down the apparatus.

This response of the gas pressure to the evaporator and compartment air temperatures is such that a desired mean temperature is maintained in the refrigerating compartment, such as 40° F., the motor 8 being started and stopped at predetermined maximum and minimum compartment air temperatures, such as 45° F. and 35° F. The response to the temperature of the evaporator 5 is indispensable for the purpose of preventing excessively low evaporator temperatures with consequent damage to the apparatus. For example, in starting the refrigerator with the compartment air temperature at a high ambient temperature, the gas pressure in the bellows, tube and bulb will decrease sufficiently to shut down the refrigerating apparatus when the evaporator is cooled to a predetermined minimum temperature but before the compartment air temperature has been decreased to the desired value. After a plurality of operating cycles of the cooling aparatus, the compartment air temperature is decreased to the desired value.

Thereafter to effect the starting of the refrigerating apparatus, the compartment air temperature must increase to a maximum value above the predetermined mean temperature, irrespective of the temperature of the evaporator. Therefore, when the refrigerator is moved to a region having an outside air temperature lower than the predetermined minimum compartment air temperature, the cooling apparatus is permanently shut off because the outside air effects the desired cooling of the compartment air so that the compartment air cannot rise to the predetermined maximum to start the cooling apparatus. In such case, the gas pressure in the temperature responsive device does not get high enough to start the refrigerator even though the temperature of the evaporator itself increases slightly over the predetermined minimum air temperature of 35° F.

It will be understood that I have shown the control and refrigerating apparatus diagrammatically. The bellows 1 preferably is connected to operate the switch 2 through snap operating means, such as described and claimed in U. S. Patent 2,179,285, issued on November 7, 1939, to John Eaton. The switch 2 controls the starting and stopping of an electric driving motor 8 connected to a suitable compressor 9. The compressor supplies liquid refrigerant to the evaporator 5 through a suitable condenser and a float chamber 10, the refrigerant being withdrawn from the evaporator to the compressor through a conduit 11.

Preferably, for operation of the refrigerator at varying altitudes, a second sealed expansible bellows 12, as shown in Fig. 2, is provided in opposition to the bellows 1 for the purpose of correcting the control for changes in barometric pressure, as described and claimed in my copending application Serial No. 564,471, filed November 21, 1944. The bellows 12 is preferably filled with air, and when connected directly in opposition to the temperature responsive bellows 1, as shown, the area of its movable wall is the same as the area of the movable wall of the bellows 1 so that changes in barometric pressure affect the two bellows in opposite senses and offset each other.

It will be understood that the portion of the bulb 3 which is exposed to the air in the cooling compartment can be varied in length as desired to vary the relative influence on the control of the motor 8 of the evaporator temperature as compared with the compartment air temperature. An adjustment of the bulb downward increases its response to the compartment air temperature while at the same time decreasing its response to the evaporator temperature, and vice versa.

While I have shown a particular embodiment of my invention, it will be understood, of course, that I do not wish to be limited thereto, since many modifications may be made, and I therefore contemplate by the appended claims to cover any such modifications as fall within the true spirit and scope of my invention.

What I claim as new and desire to secure by Letters Patent in the United States is:

1. The combination with a refrigerator provided with a cooling compartment, an evaporator in said compartment and means including driving means for maintaining a predetermined low temperature in said evaporator, of temperature responsive means comprising a sealed container provided with a movable portion and elongated member, a gas in said container adapted to be gasified at the normal temperatures of the air in said cooling compartment between predetermined maximum and minimum values but condensed to a liquid at temperatures substantially as low as the temperature of said evaporator, control means for said driving means operated by said movable portion in response to changes in the pressure of said gas to start and stop said driving means, and means mounting said elongated member in an upright position in said cooling compartment with an upper portion of said elongated member of predetermined length in good thermal relation with said evaporator and a lower portion of said elongated member extending downward into said cooling compartment so that the wall of said upper portion is maintained by said evaporator at a low temperature at which said gas is condensed on said wall and runs down said wall to the lower portion of said tubular member where it is gasified by the higher temperature of the air in said cooling compartment thereby to provide a rapid transfer of heat from said air to said gas and control of said driving means in response to the temperature of said air.

2. The combination with a refrigerator provided with a cooling compartment, an evaporator in said compartment and means including driving means for maintaining a predetermined low temperature in said evaporator, of temperature responsive means comprising a sealed container provided with a movable wall and elongated member, a gas in said container adapted to be gasified at normal temperatures of the air in said cooling compartment between predetermined maximum and minimum values but condensed to a liquid at temperatures substantially as low as the temperature of said evaporator, control means for said driving means operated by said movable wall in response to changes in the pressure of said gas to start and stop said driving means, and means mounting said elongated member in an upright position in said cooling compartment with an upper portion of said elongated member of predetermined length in good thermal relation with said evaporator and a lower portion of said elongated member extending downward into said cooling compartment so that the wall of said upper portion is maintained by said evaporator at a low temperature at which said gas is condensed on said wall and runs down said wall to the lower portion of said tubular member where it is gasified by the higher temperature of the air in said cooling compartment, said upper portion of said elongated member having a predetermined length such that the gas pressure in said sealed container is responsive both to the temperature of the air in said compartment and the temperature of said evaporator so as to start and stop said driving means in response to said predetermined maximum and minimum temperatures of the air in said cooling compartment but stop said driving means regardless of the temperature of the air in said cooling compartment when said evaporator is cooled to a predetermined minimum temperature.

3. The combination with a refrigerator provided with a cooling compartment, an evaporator in said compartment and means including a driving motor for maintaining a predetermined low temperature in said evaporator, of temperature responsive control means for said motor comprising a sealed container provided with a movable wall and a closed end tubular member, a gas in said container adapted to be gasified at normal temperatures of the air in said cooling compartment between predetermined maximum and minimum values but condensed to a liquid at temperatures substantially as low as the temperature of said evaporator, switching means operated by said movable wall in response to changes in the pressure of said gas to start and stop said motor, and means mounting said tubular member in an upright position on said evaporator with an upper portion of said tubular member of predetermined length in good thermal relation with said evaporator and a lower closed end portion of said tubular member extending downward into said cooling compartment so that the wall of said upper portion is maintained by said evaporator at a low temperature at which said gas is condensed on said wall and runs down said wall to said lower end portion where it is gasified by the higher temperature of the air in said cooling compartment, said upper portion of said tubular member having a predetermined length such that the gas pressure in said sealed container is responsive both to the temperature of the air in said compartment and the temperature of said evaporator so as to start and stop said motor in response to said predetermined maximum and minimum temperatures of the air in said cooling compartment and stop said driving means regardless of the temperature of the air in said cooling compartment when said evaporator is cooled to a predetermined minimum temperature.

EDGAR H. AYERS.

REFERENCES CITED

The following references are of record in the file of this patent:

UNITED STATES PATENTS

| Number | Name | Date |
| --- | --- | --- |
| 1,960,802 | Backstrom et al. | May 29, 1934 |
| 2,279,888 | Hobbs | Apr. 14, 1942 |
| 2,419,376 | Shaw | Apr. 22, 1947 |
| 2,419,377 | Shaw | Apr. 22, 1947 |